US011448542B2

(12) United States Patent
Valavala et al.

(10) Patent No.: US 11,448,542 B2
(45) Date of Patent: Sep. 20, 2022

(54) DOSING CAP WITH ADJUSTABLE VOLUME

(71) Applicant: Dow Global Technologies LLC, Midland, MI (US)

(72) Inventors: Pavan K. Valavala, Lake Jackson, TX (US); Marc S. Black, Midland, MI (US); Piyush Soni, Midland, MI (US); Wenbo Xu, Lake Jackson, TX (US); Hieu Truong, Lake Jackson, TX (US); Sam L. Crabtree, Lake Jackson, TX (US); Kumar N. Sanketh, Freeport, TX (US); Siddharth Ram Athreya, Freeport, TX (US); Amanda Craig, Houston, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 17/289,503

(22) PCT Filed: Oct. 14, 2019

(86) PCT No.: PCT/US2019/056097
§ 371 (c)(1),
(2) Date: Apr. 28, 2021

(87) PCT Pub. No.: WO2020/091984
PCT Pub. Date: May 7, 2020

(65) Prior Publication Data
US 2021/0389166 A1  Dec. 16, 2021

Related U.S. Application Data

(60) Provisional application No. 62/753,714, filed on Oct. 31, 2018.

(51) Int. Cl.
G01F 11/26 (2006.01)
B65D 41/26 (2006.01)
G01F 11/28 (2006.01)

(52) U.S. Cl.
CPC ............ G01F 11/263 (2013.01); B65D 41/26 (2013.01); G01F 11/268 (2013.01); G01F 11/288 (2013.01)

(58) Field of Classification Search
CPC .... G01F 11/263; G01F 11/268; G01F 11/288; G01F 23/292; G01F 23/2927;
(Continued)

(56) References Cited

U.S. PATENT DOCUMENTS 3,141,579 A * 7/1964 Medlock ............... G01F 11/286
222/207
3,190,505 A * 6/1965 Arbitman ............... G01F 11/288
222/207

(Continued)

FOREIGN PATENT DOCUMENTS

DE 20319174 U1 2/2004
GB 2324297 A 10/1998

*Primary Examiner* — Paul R Durand
*Assistant Examiner* — Michael J. Melaragno
(74) *Attorney, Agent, or Firm* — Quarles & Brady LLP (57) ABSTRACT

The present disclosure provides a dosing cap. In an embodiment, the dosing cap includes (A) a collar member having an annular skirt depending from a base. An inner surface of the annular skirt has a securing member for securing the collar member to a neck of a container. The base includes (i) at least one opening with a one-way valve permitting fluid flow in a first direction, and (ii) an air channel with a one-way valve permitting fluid flow in a second direction. The dosing cap includes (B) a cap member having an annular sidewall extending from a dispensing element. An inner surface of the annular sidewall has an attachment member adjustably attached to a reciprocal attachment member on an outer (Continued)

surface of the first sidewall. The dosing cap includes (C) a metering chamber formed by an enclosed volume between the cap member and the base. The dosing cap includes (D) the dispensing element permitting flow of a fluid from the metering chamber.

19 Claims, 6 Drawing Sheets

(58) Field of Classification Search
CPC .... G01F 23/2921; G01F 11/02; G01F 11/025; G01F 11/027; G01F 11/028; G01F 11/086; G01F 11/088; G01F 11/125; G01F 11/286; B65D 41/26; B65D 47/122; B65D 47/127; B65D 51/2807; B65D 81/3227; B65D 85/804; B65D 83/04; B65D 83/0409; B65D 83/7535; B65D 25/14; B65D 77/06; B65D 83/0055; B65D 83/0072; B65D 83/62; B65D 85/8043; B67D 1/0001; B67D 1/0019; B67D 1/0078; B67D 1/0871; B67D 1/0888; B67D 1/1231; B67D 1/1238; B67D 1/1247; B67D 2001/0091; B67D 2001/0811; B67D 2001/1263; B67D 2210/00146; B67D 1/0079; B67D 1/102; B67D 2001/0093; B67D 2001/0096; B67D 1/0016; B67D 1/0017; B67D 1/0872; B67D 2001/082; B67D 2001/1259; B67D 2210/00065; B67D 2210/0012; B67D 2210/00128; B67D 1/0004; B67D 1/0462; B67D 2001/0824; B67D 2001/0828; B67D 7/0255; A61J 7/0053; A61J 15/00; A61J 15/0003; A61J 15/003; A61J 15/0034
USPC ......... 17/205, 282, 305, 434, 438, 454, 456, 17/188, 636, 425; 222/17, 205, 282, 305, 222/434, 438, 454, 456, 188, 636, 425
See application file for complete search history.

(56) References Cited

U.S. PATENT DOCUMENTS

| | | | |
|---|---|---|---|
| 3,628,700 A * | 12/1971 | Dodoghue | B05B 11/0059 222/187 |
| 3,767,088 A * | 10/1973 | Deussen | B65D 47/06 222/205 |
| 3,844,454 A * | 10/1974 | Buchtel | G01F 11/32 222/453 |
| 4,941,598 A | 7/1990 | Lambelet, Jr. et al. | |
| 5,031,802 A * | 7/1991 | Joulia | G01F 11/08 222/205 |
| 5,330,081 A * | 7/1994 | Davenport | B65D 1/323 222/207 |
| 5,381,930 A * | 1/1995 | Kalabakas | G01F 11/02 222/205 |
| 5,407,105 A * | 4/1995 | Santagiuliana | G01F 11/263 222/425 |
| 5,411,186 A * | 5/1995 | Robbins, III | B65D 47/0814 222/442 |
| 5,549,224 A * | 8/1996 | Wu | B65D 51/1688 222/158 |
| 5,584,420 A * | 12/1996 | Awada | G01F 11/263 222/153.09 |
| 5,636,765 A | 6/1997 | DeJonge | |
| 5,677,383 A | 10/1997 | Chum et al. | |
| 5,967,377 A * | 10/1999 | Glynn | B05B 11/3004 222/158 |
| 6,003,728 A | 12/1999 | Elliott | |
| 6,068,165 A * | 5/2000 | Minihane | G01F 11/32 222/425 |
| 6,111,023 A | 8/2000 | Chum et al. | |
| 6,334,550 B1 * | 1/2002 | De Backer | G01F 11/286 222/205 |
| 6,644,471 B1 | 11/2003 | Anderson | |
| 6,923,344 B1 * | 8/2005 | Chien | G01F 11/286 222/158 |
| 6,984,695 B2 | 1/2006 | Brown et al. | |
| 7,608,668 B2 | 10/2009 | LiPi Shan et al. | |
| 7,815,072 B2 | 10/2010 | Webster et al. | |
| 8,579,164 B1 * | 11/2013 | Sanguinet | B65D 51/242 222/207 |
| 10,422,679 B2 * | 9/2019 | Geissler | G01F 11/32 |
| 2004/0112916 A1 | 6/2004 | Hagihara et al. | |
| 2005/0139622 A1 | 6/2005 | Saulle | |
| 2008/0308183 A1 | 12/2008 | Law | |
| 2009/0302063 A1 * | 12/2009 | Maas | G01F 11/286 222/205 |
| 2010/0240757 A1 * | 9/2010 | Meehan | A61M 35/003 514/567 |
| 2014/0231462 A1 | 8/2014 | Ray et al. | |
| 2015/0102068 A1 * | 4/2015 | Wegener | G01F 11/286 222/205 |
| 2016/0244222 A1 * | 8/2016 | Sterling | G01F 11/30 |

* cited by examiner

DOSING CAP WITH ADJUSTABLE VOLUME

Common in today's "on-the-go" consumer marketplace is the squeeze bottle. The conventional squeeze bottle finds utility in countless applications for the storage and dispensing of liquids—from bottled water and sports beverages to mouthwash, shampoo, and motor oil. The typical squeeze bottle includes a flexible (squeezable) body made of a flexible plastic material and a rigid (plastic) screw cap; the screw cap oftentimes is integrated with a dispensing member such as a push-pull cap or a flip-top cap. The squeeze bottle is attractive due to its ease-of-use, ease of production, and low cost.

One shortcoming of the conventional squeeze bottle is its inability to provide conveniently a metered dose of liquid therefrom. Attempts to remedy this deficiency include rigid cap structures with dip tubes, pistons, or pump devices. These types of cap structures impart complexity, cost, weight and rigidity to the squeeze bottle—each a deleterious burden upon the simplistic ubiquity of today's squeeze bottle.

The art recognizes the need for a squeeze bottle with the ability to conveniently, accurately, and quickly dispense a metered dose of the fluid content contained therein.

SUMMARY

The present disclosure provides a dosing cap. In an embodiment, the dosing cap includes (A) a collar member having an annular skirt depending from a base. An inner surface of the annular skirt has a securing member for securing the collar member to a neck of a container. The base includes (i) at least one opening with a one-way valve permitting fluid flow in a first direction, and (ii) an air channel with a one-way valve permitting fluid flow in a second direction. The dosing cap includes (B) a cap member having an annular sidewall extending from a dispensing element. An inner surface of the annular sidewall has an attachment member adjustably attached to a reciprocal attachment member on an outer surface of the first sidewall. The dosing cap includes (C) a metering chamber formed by an enclosed volume between the cap member and the base. The dosing cap includes (D) the dispensing element permitting flow of a fluid from the metering chamber.

DEFINITIONS

The numerical ranges disclosed herein include all values from, and including, the lower value and the upper value. For ranges containing explicit values (e.g., 1, or 2, or 3 to 5, or 6, or 7) any subrange between any two explicit values is included (e.g., 1 to 2; 2 to 6; 5 to 7; 3 to 7; 5 to 6; etc.).

Unless stated to the contrary, implicit from the context, or customary in the art, all parts and percents are based on weight, and all test methods are current as of the filing date of this disclosure.

The term "composition," as used herein, refers to a mixture of materials which comprise the composition, as well as reaction products and decomposition products formed from the materials of the composition.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

An "ethylene-based polymer" is a polymer that contains more than 50 weight percent (wt %) polymerized ethylene monomer (based on the total amount of polymerizable monomers) and, optionally, may contain at least one comonomer. Ethylene-based polymer includes ethylene homopolymer, and ethylene copolymer (meaning units derived from ethylene and one or more comonomers). The terms "ethylene-based polymer" and "polyethylene" may be used interchangeably. Nonlimiting examples of ethylene-based polymer (polyethylene) include low density polyethylene (LDPE) and linear polyethylene. Nonlimiting examples of linear polyethylene include linear low density polyethylene (LLDPE), ultra low density polyethylene (ULDPE), very low density polyethylene (VLDPE), multi-component ethylene-based copolymer (EPE), ethylene/α-olefin multi-block copolymers (also known as olefin block copolymer (OBC)), substantially linear, or linear, plastomers/elastomers, and high density polyethylene (HDPE). Generally, polyethylene may be produced in gas-phase, fluidized bed reactors, liquid phase slurry process reactors, or liquid phase solution process reactors, using a heterogeneous catalyst system, such as Ziegler-Natta catalyst, a homogeneous catalyst system, comprising Group 4 transition metals and ligand structures such as metallocene, non-metallocene metal-centered, heteroaryl, heterovalent aryloxyether, phosphinimine, and others. Combinations of heterogeneous and/or homogeneous catalysts also may be used in either single reactor or dual reactor configurations.

"Ethylene plastomers/elastomers" are substantially linear, or linear, ethylene/α-olefin copolymers containing homogeneous short-chain branching distribution comprising units derived from ethylene and units derived from at least one $C_3$-$C_{10}$ α-olefin comonomer. Ethylene plastomers/elastomers have a density from 0.870 g/cc to 0.917 g/cc. Nonlimiting examples of ethylene plastomers/elastomers include AFFINITY™ plastomers and elastomers (available from The Dow Chemical Company), EXACT™ Plastomers (available from ExxonMobil Chemical), Tafmer™ (available from Mitsui), Nexlene™ (available from SK Chemicals Co.), and Lucene™ (available LG Chem Ltd.).

"High density polyethylene" (or "HDPE") is an ethylene homopolymer or an ethylene/α-olefin copolymer with at least one $C_4$-$C_{10}$ α-olefin comonomer, or $C_4$-$C_8$ α-olefin comonomer and a density from 0.940 g/cc, or 0.945 g/cc, or 0.950 g/cc, 0.953 g/cc to 0.955 g/cc, or 0.960 g/cc, or 0.965 g/cc, or 0.970 g/cc, or 0.975 g/cc, or 0.980 g/cc. The HDPE can be a monomodal copolymer or a multimodal copolymer. A "monomodal ethylene copolymer" is an ethylene/$C_4$-$C_{10}$ α-olefin copolymer that has one distinct peak in a gel permeation chromatography (GPC) showing the molecular weight distribution. A "multimodal ethylene copolymer" is an ethylene/$C_4$-$C_{10}$ α-olefin copolymer that has at least two distinct peaks in a GPC showing the molecular weight distribution. Multimodal includes copolymer having two peaks (bimodal) as well as copolymer having more than two peaks. Nonlimiting examples of HDPE include DOW™ High Density Polyethylene (HDPE) Resins (available from The Dow Chemical Company), ELITE™ Enhanced Polyethylene Resins (available from The Dow Chemical Company), CONTINUUM™ Bimodal Polyethylene Resins (available from The Dow Chemical Company), LUPOLEN™ (available from LyondellBasell), as well as HDPE products from Borealis, Ineos, and ExxonMobil.

An "interpolymer" is a polymer prepared by the polymerization of at least two different monomers. This generic term includes copolymers, usually employed to refer to polymers prepared from two different monomers, and polymers prepared from more than two different monomers, e.g., terpolymers, tetrapolymers, etc.

"Low density polyethylene" (or "LDPE") consists of ethylene homopolymer, or ethylene/α-olefin copolymer comprising at least one $C_3$-$C_{10}$ α-olefin that has a density from 0.915 g/cc to less than 0.940 g/cc and contains long chain branching with broad MWD. LDPE is typically produced by way of high pressure free radical polymerization (tubular reactor or autoclave with free radical initiator). Nonlimiting examples of LDPE include MarFlex™ (Chevron Phillips), LUPOLEN™ (LyondellBasell), as well as LDPE products from Borealis, Ineos, ExxonMobil, and others.

"Linear low density polyethylene" (or "LLDPE") is a linear ethylene/α-olefin copolymer containing heterogeneous short-chain branching distribution comprising units derived from ethylene and units derived from at least one $C_3$-$C_{10}$ α-olefin comonomer. LLDPE is characterized by little, if any, long chain branching, in contrast to conventional LDPE. LLDPE has a density from 0.910 g/cc to less than 0.940 g/cc. Nonlimiting examples of LLDPE include TUFLIN™ linear low density polyethylene resins (available from The Dow Chemical Company), DOWLEX™ polyethylene resins (available from the Dow Chemical Company), and MARLEX™ polyethylene (available from Chevron Phillips).

"Multi-component ethylene-based copolymer" (or "EPE") comprises units derived from ethylene and units derived from at least one $C_3$-$C_{10}$ α-olefin comonomer, such as described in patent references U.S. Pat. Nos. 6,111,023; 5,677,383; and 6,984,695. EPE resins have a density from 0.905 g/cc to 0.962 g/cc. Nonlimiting examples of EPE resins include ELITE™ enhanced polyethylene (available from The Dow Chemical Company), ELITE AT™ advanced technology resins (available from The Dow Chemical Company), SURPASS™ Polyethylene (PE) Resins (available from Nova Chemicals), and SMART™ (available from SK Chemicals Co.).

An "olefin-based polymer" or "polyolefin" is a polymer that contains more than 50 weight percent polymerized olefin monomer (based on total amount of polymerizable monomers), and optionally, may contain at least one comonomer. A nonlimiting example of an olefin-based polymer is ethylene-based polymer.

A "polymer" is a compound prepared by polymerizing monomers, whether of the same or a different type, that in polymerized form provide the multiple and/or repeating "units" or "mer units" that make up a polymer. The generic term polymer thus embraces the term homopolymer, usually employed to refer to polymers prepared from only one type of monomer, and the term copolymer, usually employed to refer to polymers prepared from at least two types of monomers. It also embraces all forms of copolymer, e.g., random, block, etc. The terms "ethylene/α-olefin polymer" and "propylene/α-olefin polymer" are indicative of copolymer as described above prepared from polymerizing ethylene or propylene respectively and one or more additional, polymerizable α-olefin monomer. It is noted that although a polymer is often referred to as being "made of" one or more specified monomers, "based on" a specified monomer or monomer type, "containing" a specified monomer content, or the like, in this context the term "monomer" is understood to be referring to the polymerized remnant of the specified monomer and not to the unpolymerized species. In general, polymers herein are referred to as being based on "units" that are the polymerized form of a corresponding monomer.

A "propylene-based polymer" is a polymer that contains more than 50 weight percent polymerized propylene monomer (based on the total amount of polymerizable monomers) and, optionally, may contain at least one comonomer. Propylene-based polymer includes propylene homopolymer, and propylene copolymer (meaning units derived from propylene and one or more comonomers). The terms "propylene-based polymer" and "polypropylene" may be used interchangeably. Nonlimiting examples of suitable propylene copolymer include propylene impact copolymer and propylene random copolymer.

"Ultra low density polyethylene" (or "ULDPE") and "very low density polyethylene" (or "VLDPE") each is a linear ethylene/α-olefin copolymer containing heterogeneous short-chain branching distribution comprising units derived from ethylene and units derived from at least one $C_3$-$C_{10}$ α-olefin comonomer. ULDPE and VLDPE each has a density from 0.885 g/cc to 0.915 g/cc. Nonlimiting examples of ULDPE and VLDPE include ATTANE™ ultra low density polyethylene resins (available from The Dow Chemical Company) and FLEXOMER™ very low density polyethylene resins (available from The Dow Chemical Company).

TEST METHODS

Density is measured in accordance with ASTM D792, Method B. The result is recorded in grams per cubic centimeter (g/cc).

Differential Scanning Calorimetry (DSC)

Differential Scanning Calorimetry (DSC) can be used to measure the melting, crystallization, and glass transition behavior of a polymer over a wide range of temperature. For example, the TA Instruments Q1000 DSC, equipped with an RCS (refrigerated cooling system) and an autosampler is used to perform this analysis. During testing, a nitrogen purge gas flow of 50 ml/min is used. Each sample is melt pressed into a thin film at about 175° C.; the melted sample is then air-cooled to room temperature (about 25° C.). A 3-10 mg, 6 mm diameter specimen is extracted from the cooled polymer, weighed, placed in a light aluminum pan (ca 50 mg), and crimped shut. Analysis is then performed to determine its thermal properties.

The thermal behavior of the sample is determined by ramping the sample temperature up and down to create a heat flow versus temperature profile. First, the sample is rapidly heated to 180° C. and held isothermal for 3 minutes in order to remove its thermal history. Next, the sample is cooled to −40° C. at a 10° C./minute cooling rate and held isothermal at −40° C. for 3 minutes. The sample is then heated to 180° C. (this is the "second heat" ramp) at a 10° C./minute heating rate. The cooling and second heating curves are recorded. The cool curve is analyzed by setting baseline endpoints from the beginning of crystallization to −20° C. The heat curve is analyzed by setting baseline endpoints from −20° C. to the end of melt. The values determined are extrapolated onset of melting, Tm, and extrapolated onset of crystallization, Tc. Heat of fusion ($H_f$) (in Joules per gram), and the calculated % crystallinity for polyethylene samples using the following Equation: % Crystallinity=$((H_f)/292$ J/g$)\times 100$.

The heat of fusion ($H_f$) (also known as melt enthalpy) and the peak melting temperature are reported from the second heat curve.

Melting point, Tm, is determined from the DSC heating curve by first drawing the baseline between the start and end of the melting transition. A tangent line is then drawn to the data on the low temperature side of the melting peak. Where this line intersects the baseline is the extrapolated onset of melting (Tm). This is as described in Bernhard Wunderlich, *The Basis of Thermal Analysis, in Thermal Characterization of Polymeric Materials* 92,277-278 (Edith A. Turi ed., 2d ed. 1997).

Melt index (MI) (I2) in g/10 min is measured using ASTM D1238 (190° C./2.16 kg).

Melt flow rate (MFR) in g/10 min is measured using ASTM D1238 (230° C./2.16 kg).

DETAILED DESCRIPTION

The present disclosure is directed to a dosing cap. In an embodiment, the dosing cap includes (A) a collar member. The collar member has an annular skirt depending from a base. An inner surface of the skirt has a securing member for securing the collar member to a neck of a container. The base of the collar member includes (i) at least one opening with a one-way valve permitting fluid flow in a first direction, and (ii) an air channel with a one-way valve permitting fluid flow in a second direction. The dosing cap further includes (B) a cap member having an annular sidewall extending from a dispensing element. An inner surface of the sidewall has an attachment member adjustably attached to a reciprocal attachment member on an outer surface of the annular skirt. The dosing cap includes (C) a metering chamber. The metering chamber is formed by an enclosed volume between the cap member and the base. The dispensing element (D) permits flow of fluid from the metering chamber.

FIGS. 1, 2A, 2B, and 3 show a dosing cap 10. Dosing cap 10 includes a collar member 12, and a cap member 112. The collar member 12 has a base 16. An annular skirt 18 depends from, or otherwise extends from, the base 16. The annular skirt 18 has an inner circumferential inner surface. Located on an inner surface of the skirt 18 is a securing member. The securing member secures the collar member (and thereby the dosing cap 10) to a neck of a container. Nonlimiting examples of suitable securing members include a snap structure and threads.

The container upon which the dosing cap is attached may be flexible or rigid. In an embodiment, the container is flexible and is a squeeze bottle 20 as shown in FIGS. 1-7. A "squeeze bottle," as used herein, is a container with a dispensing outlet that is made of polymeric material for dispensing liquid; the sidewall of the squeeze bottle is flexible. Activation of the squeeze bottle is accomplished by applying a squeezing force onto the sidewall—typically by exerting pressure with a user's hand. The manual pressure applied to the flexible sidewall compresses the air and liquid within the bottle interior, thereby discharging the liquid contents in the squeeze bottle through the dispensing outlet.

Figure 1:
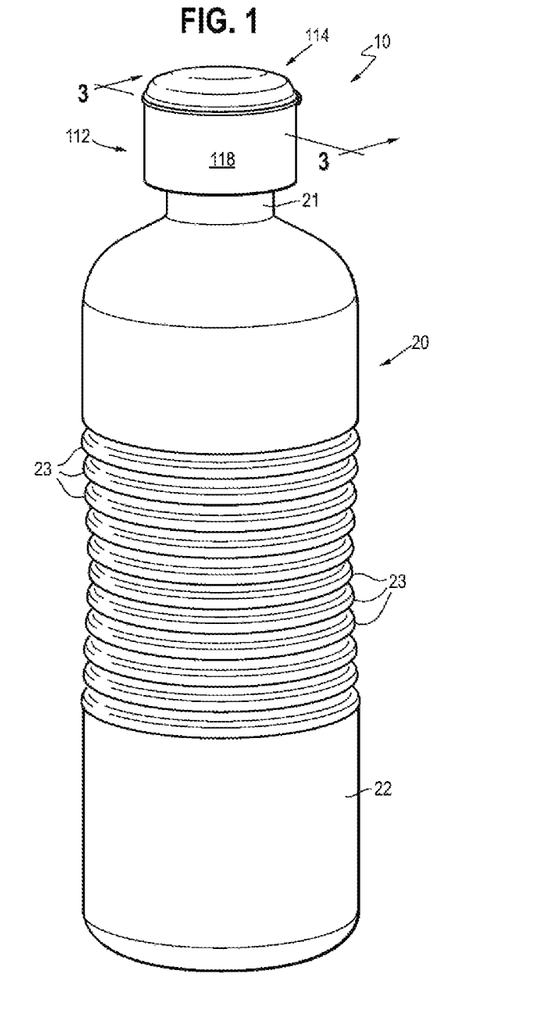
FIG. 1 is a perspective view of a dosing cap on a bottle, in accordance with an embodiment of the present disclosure.

Squeeze bottle 20 includes a neck 21 and a body 22. The body 22 may or may not include additional structure, design, and/or contour features. In an embodiment, the body 22 includes circumferential ribs 23, as shown in FIG. 1.

Attachment between the collar member 12 and the neck 21 may be (i) releasable or (ii) permanent. In an embodiment, attachment between the collar member 12 and the neck 21 is releasable and the securing member located on the annular skirt 18 includes internal threads 24. The internal threads 24 operatively mate, and interlock, with external threads 26 located on the exterior surface of neck 21. The interlocking threads 24, 26 provide releasable attachment between the collar member 12 and the neck 21. Consequently, an advantage of the present dosing cap 10 is the ability to attach the dosing cap to any incumbent container (and any incumbent squeeze bottles in particular) having a threaded neck.

Figure 3:
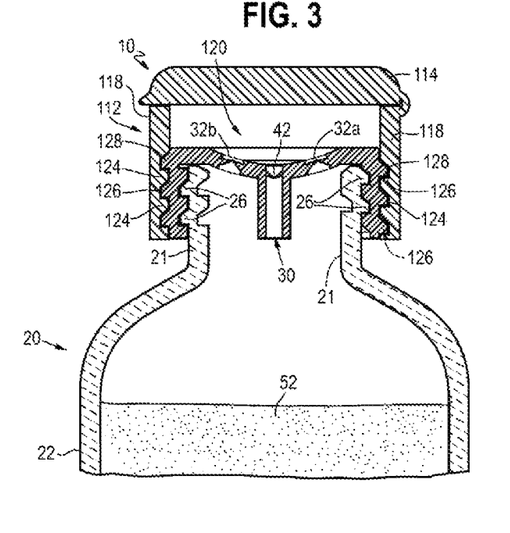
FIG. 3 is a sectional view of the dosing cap on the bottle, taken along line 3-3 of FIG. 1.
Figure 4A:
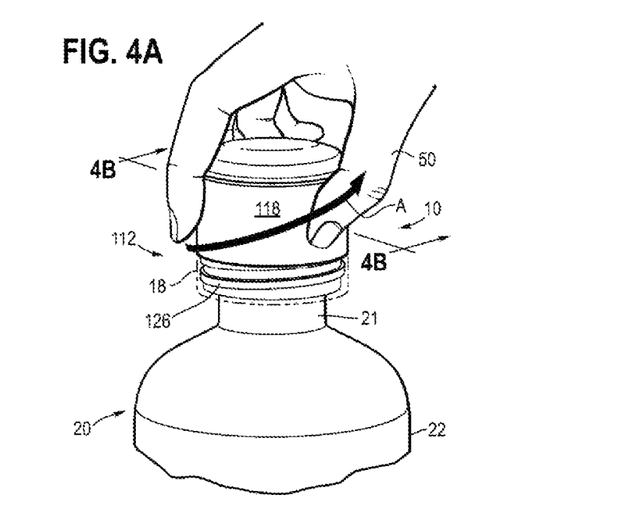
FIG. 4A is a perspective view of a person adjusting the volume of the metering chamber, in accordance with an embodiment of the present disclosure.
Figure 4B:
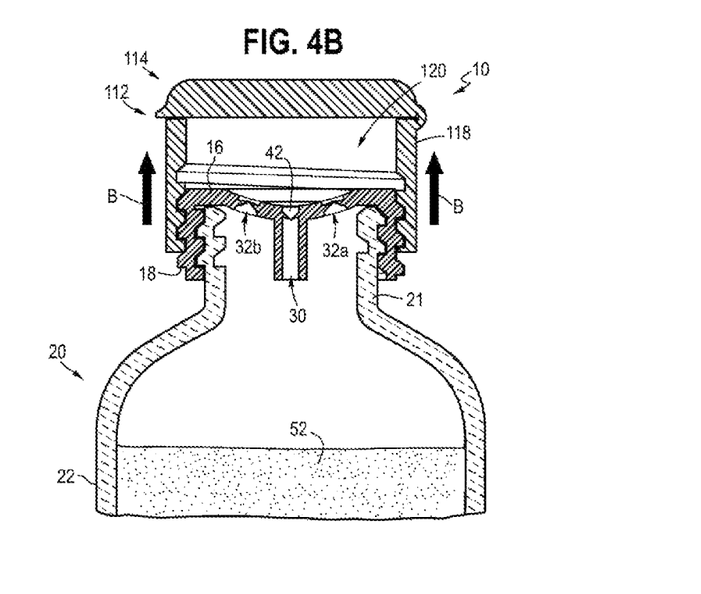
FIG. 4B is a sectional view of the dosing cap on the bottle taken along line 4B-4B of FIG. 4A.

As shown in FIG. 3, the cap member 112 includes a dispensing element 114 and an annular sidewall 118 extending from the dispensing element 114. Suitable structure on the inner surface of the annular sidewall 118 and structure on the outer surface of the skirt 18 enables adjustable attachment between the cap member 112 and the collar member 12. The term "adjustable attachment," as used herein, is securement between the collar member and the cap member wherein the cap member is moveable with respect to the collar member, the cap member remaining secured, or otherwise attached, to the collar member. Nonlimiting examples of adjustable attachment include telespcopic (sliding) attachment and threaded (twist or screw) attachment.

In an embodiment, the adjustable attachment is accomplished by way of threaded attachment. As shown in FIG. 3, the cap member 112 includes internal threads 124 which operatively mate, and interlock, with external threads 126 on the outer surface of the annular skirt 18. The interlocking threads 124, 126 provide adjustable securement between the cap member 112 and the collar member 12. The annular skirt 18 includes a locking member 128. The locking member 128 prevents the cap member 112 from being completely unscrewed, or otherwise completely unthreaded, from the collar 12.

Adjustable attachment of the cap member 112 to the collar member 12 forms a metering chamber 120. The metering chamber 120 is an enclosed volume between the cap member 112 and the base 16. The metering chamber 120 has a predetermined minimum volume and a predetermined maximum volume. Adjusting (twisting, screwing, or otherwise rotating) the position of the cap member 112 upon the collar member 12 correspondingly adjusts the volume of the metering chamber between the minimum volume and the maximum volume. The cap member 112 is movable with respect to the collar member 12 and advantageously permits a user to set a predetermined dose amount between the minimum volume and the maximum volume of the metering chamber.

Figure 2A:
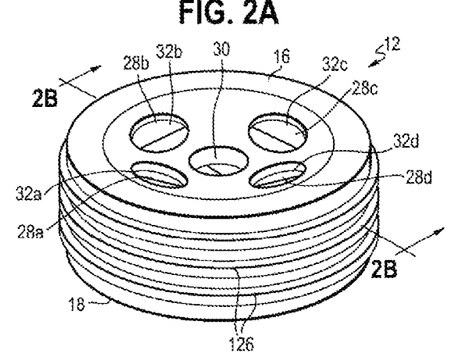
FIG. 2A is a perspective view of a collar member, in accordance with an embodiment of the present disclosure.
Figure 2B:
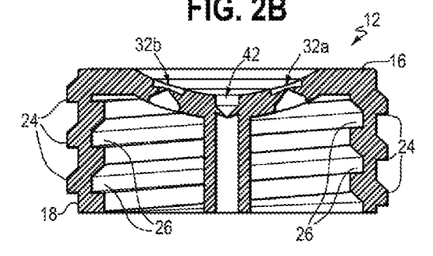
FIG. 2B is a sectional view of the collar member taken along line 2B-2B of FIG. 2A.

FIGS. 2A and 2B show the collar member 12. The collar member 12 includes base 16. The base 16 includes (i) at least one opening with a one-way valve permitting fluid flow in a first direction. The base 16 also includes an air channel with a one-way valve permitting fluid flow in a second direction.

FIGS. 2A and 2B show an embodiment whereby the collar member 12 includes a plurality of openings 28a, 28b, 28c, 28d and an air channel 30. Openings 28a-28d are arranged in a space-apart manner around the air channel 30 on the base 16. It is understood that the arrangement and orientation of the openings and air channel on the base 16 can include other spatial configurations.

As shown in FIGS. 2A and 2B, extending across each opening 28a-28d is a respective one-way valve 32a, 32b, 32c, 32d. Description of one-way valve 32a will now be provided, with the description of one-way valve 32a applying equally to one-way valves 32b, 32c, and 32d. The one-way valve 32a has opposing arms 34, 36 (FIGS. 5B, 6B). Each arm 34, 36 has a tapered structure, the arms oriented and biased to contact, and impinge upon, each other to form a slit 38. The tapered structure and biased impingement of the arms 34, 36 enable the valve to open in one, and only one, first direction, i.e., a "one-way valve." In other words, the biased impingement of arm 34 on arm 36 prevents two-way flow through the valve 32a.

The slit 38 is normally closed. As shown in FIGS. 2A and 2B (and in FIGS. 5B, 6B), the tapered structure of arms 34, 36 biases the arms to allow flow in only a first direction (hereafter referred to outward flow from the container or simply "outward flow"). When pressure on the inside of the collar member 12 (vis-à-vis a squeezing force applied to the flexible container body) is greater than the pressure on the outside of the collar member 12 by an amount sufficient to overcome the elastic forces of the arms 34, 36 which hold the slit 38 closed, the slit 38 opens to permit fluid from the container to pass through the opening 32a and enter into the metering chamber 120.

A one-way valve 42 extends across air channel 30. One-way valve 42 has opposing arms, arm 44 and arm 46. Each arm 44, 46 has a tapered structure, the arms oriented and biased to contact, and impinge upon, each other to form a slit 48. The tapered structure and biased impingement of the arms 44, 46 permits the one-way valve 42 to open in one, and only one, second direction, i.e., a "one-way valve."

The slit 48 is normally closed. As shown in FIGS. 2A and 2B, the tapered structure of arms 44, 46 biases the arms to permit flow in a second direction (hereafter referred to as inward flow into the container or simply "inward flow"). When pressure on the inside of the collar member 12 (vis-à-vis a squeezing force applied to the flexible container body) is greater than the pressure on the outside of the collar member 12 by an amount sufficient to overcome the elastic forces of the arms 44, 46 which hold the slit 48 closed, the slit 48 opens to allow air from the metering chamber to pass through air channel 30 and enter into the squeeze bottle 20.

Arms 44, 46 for the air channel 30 are biased in an opposite orientation compared to arms 34, 36 for the opening 32a. Consequently, where opening 32a permits one-way flow in a first direction (outward flow), air channel 30 permits one-way flow in a second direction (inward flow).

The collar member 12 and the cap member 112 each is composed of a polymeric material. Nonlimiting examples of suitable polymeric material for collar member 12 include olefin-based polymer, propylene-based polymer, and ethylene-based polymer. Collar member 12 is an integral component whereby base 16 and skirt 18 composed of the same polymeric material.

Each arm 34, 36, 44, 46 is made of an elastomeric material. The elastomeric material provides each arm 34, 36, 44, 46 with sufficient resiliency, elasticity, and flexibility for respective arm pairs 34, 36 and 44, 46 to operate as a one-way valve.

In an embodiment, the elastomeric material for each arm 34, 36, 44, 46 is an ethylene/α-olefin multi-block copolymer. The term "ethylene/α-olefin multi-block copolymer" refers to an ethylene/$C_4$-$C_8$ α-olefin multi-block copolymer consisting of ethylene and one copolymerizable $C_4$-$C_8$ α-olefin comonomer in polymerized form (and optional additives), the polymer characterized by multiple blocks or segments of two polymerized monomer units differing in chemical or physical properties, the blocks joined (or covalently bonded) in a linear manner, that is, a polymer comprising chemically differentiated units which are joined end-to-end with respect to polymerized ethylenic functionality. Ethylene/α-olefin multi-block copolymer includes block copolymer with two blocks (di-block) and more than two blocks (multi-block). The $C_4$-$C_8$ α-olefin is selected from butene, hexene, and octene. The ethylene/α-olefin multi-block copolymer is void of, or otherwise excludes, styrene (i.e., is styrene-free), and/or vinyl aromatic monomer, and/or conjugated diene. When referring to amounts of "ethylene" or "comonomer" in the copolymer, it is understood that this refers to polymerized units thereof. In some embodiments, the ethylene/α-olefin multi-block copolymer can be represented by the following formula: (AB)n; where n is at least 1, preferably an integer greater than 1, such as 2, 3, 4, 5, 10, 15, 20, 30, 40, 50, 60, 70, 80, 90, 100, or higher, "A" represents a hard block or segment, and "B" represents a soft block or segment. The As and Bs are linked, or covalently bonded, in a substantially linear fashion, or in a linear manner, as opposed to a substantially branched or substantially star-shaped fashion. In other embodiments, A blocks and B blocks are randomly distributed along the polymer chain. In other words, the block copolymers usually do not have a structure as follows: AAA-AA-BBB-BB. In an embodiment, the ethylene/α-olefin multi-block copolymer does not have a third type of block, which comprises different comonomer(s). In another embodiment, each of block A and block B has monomers or comonomers substantially randomly distributed within the block. In other words, neither block A nor block B comprises two or more sub-segments (or sub-blocks) of distinct composition, such as a tip segment, which has a substantially different composition than the rest of the block.

Preferably, ethylene comprises the majority mole fraction of the whole ethylene/α-olefin multi-block copolymer, i.e., ethylene comprises at least 50 wt % of the whole ethylene/α-olefin multi-block copolymer. More preferably, ethylene comprises at least 60 wt %, at least 70 wt %, or at least 80 wt %, with the substantial remainder of the whole ethylene/

α-olefin multi-block copolymer comprising the $C_4$-$C_8$ α-olefin comonomer. In an embodiment, the ethylene/α-olefin multi-block copolymer contains from 50 wt %, or 60 wt %, or 65 wt % to 80 wt %, or 85 wt %, or 90 wt % ethylene. For many ethylene/octene multi-block copolymers, the composition comprises an ethylene content greater than 80 wt % of the whole ethylene/octene multi-block copolymer and an octene content of from 10 wt % to 15 wt %, or from 15 wt % to 20 wt % of the whole multi-block copolymer.

The ethylene/α-olefin multi-block copolymer includes various amounts of "hard" segments and "soft" segments. "Hard" segments are blocks of polymerized units in which ethylene is present in an amount greater than 90 wt %, or 95 wt %, or greater than 95 wt %, or greater than 98 wt %, based on the weight of the polymer, up to 100 wt %. In other words, the comonomer content (content of monomers other than ethylene) in the hard segments is less than 10 wt %, or 5 wt %, or less than 5 wt %, or less than 2 wt %, based on the weight of the polymer, and can be as low as zero. In some embodiments, the hard segments include all, or substantially all, units derived from ethylene. "Soft" segments are blocks of polymerized units in which the comonomer content (content of monomers other than ethylene) is greater than 5 wt %, or greater than 8 wt %, greater than 10 wt %, or greater than 15 wt %, based on the weight of the polymer. In an embodiment, the comonomer content in the soft segments is greater than 20 wt %, greater than 25 wt %, greater than 30 wt %, greater than 35 wt %, greater than 40 wt %, greater than 45 wt %, greater than 50 wt %, or greater than 60 wt % and can be up to 100 wt %.

The soft segments can be present in an ethylene/α-olefin multi-block copolymer from 1 wt %, or 5 wt %, or 10 wt %, or 15 wt %, or 20 wt %, or 25 wt %, or 30 wt %, or 35 wt %, or 40 wt %, or 45 wt % to 55 wt %, or 60 wt %, or 65 wt %, or 70 wt %, or 75 wt %, or 80 wt %, or 85 wt %, or 90 wt %, or 95 wt %, or 99 wt % of the total weight of the ethylene/α-olefin multi-block copolymer. Conversely, the hard segments can be present in similar ranges. The soft segment weight percentage and the hard segment weight percentage can be calculated based on data obtained from DSC or NMR. Such methods and calculations are disclosed in, for example, U.S. Pat. No. 7,608,668, the disclosure of which is incorporated by reference herein in its entirety. In particular, hard and soft segment weight percentages and comonomer content may be determined as described in column 57 to column 63 of U.S. Pat. No. 7,608,668.

The ethylene/α-olefin multi-block copolymer comprises two or more chemically distinct regions or segments (referred to as "blocks") joined (or covalently bonded) in a linear manner, that is, it contains chemically differentiated units which are joined end-to-end with respect to polymerized ethylenic functionality, rather than in pendent or grafted fashion. In an embodiment, the blocks differ in the amount or type of incorporated comonomer, density, amount of crystallinity, crystallite size attributable to a polymer of such composition, type or degree of tacticity (isotactic or syndiotactic), regio-regularity or regio-irregularity, amount of branching (including long chain branching or hyper-branching), homogeneity or any other chemical or physical property. Compared to block interpolymers of the prior art, including interpolymers produced by sequential monomer addition, fluxional catalysts, or anionic polymerization techniques, the present ethylene/α-olefin multi-block copolymer is characterized by unique distributions of both polymer polydispersity (PDI or Mw/Mn or MWD), polydisperse block length distribution, and/or polydisperse block number distribution, due, in an embodiment, to the effect of the shuttling agent(s) in combination with multiple catalysts used in their preparation.

In an embodiment, the ethylene/α-olefin multi-block copolymer is produced in a continuous process and possesses a polydispersity index (Mw/Mn) from 1.7 to 3.5, or from 1.8 to 3, or from 1.8 to 2.5, or from 1.8 to 2.2. When produced in a batch or semi-batch process, the ethylene/α-olefin multi-block copolymer possesses Mw/Mn from 1.0 to 3.5, or from 1.3 to 3, or from 1.4 to 2.5, or from 1.4 to 2.

In addition, the ethylene/α-olefin multi-block copolymer possesses a PDI (or Mw/Mn) fitting a Schultz-Flory distribution rather than a Poisson distribution. The present ethylene/α-olefin multi-block copolymer has both a polydisperse block distribution as well as a polydisperse distribution of block sizes. This results in the formation of polymer products having improved and distinguishable physical properties. The theoretical benefits of a polydisperse block distribution have been previously modeled and discussed in Potemkin, *Physical Review E* (1998) 57 (6), pp. 6902-6912, and Dobrynin, *J. Chem. Phys.* (1997) 107 (21), pp 9234-9238.

In an embodiment, the present ethylene/α-olefin multi-block copolymer possesses a most probable distribution of block lengths.

Nonlimiting examples of suitable ethylene/α-olefin multi-block copolymer are disclosed in U.S. Pat. No. 7,608,668, the entire content of which is incorporated by reference herein.

In an embodiment, the ethylene/α-olefin multi-block copolymer has hard segments and soft segments, is styrene-free, consists of only (i) ethylene and (ii) a $C_4$-$C_8$ α-olefin (and optional additives), and is defined as having a Mw/Mn from 1.7 to 3.5, at least one melting point, Tm, in degrees Celsius, and a density, d, in grams/cubic centimeter, wherein the numerical values of Tm and d correspond to the relationship:

$$Tm > -2002.9 + 4538.5(d) - 2422.2(d)^2,$$

where the density, d, is from 0.850 g/cc, or 0.860 g/cc, or 0.870 g/cc to 0.875 g/cc, or 0.877 g/cc, or 0.880 g/cc, or 0.890 g/cc; and the melting point, Tm, is from 110° C., or 115° C., or 120° C. to 122° C., or 125° C., or 130° C., or 135° C.

In an embodiment, the ethylene/α-olefin multi-block copolymer is an ethylene/1-octene multi-block copolymer (consisting only of ethylene and octene comonomer) and has one, some, or all of the following properties: (i) a Mw/Mn from 1.7, or 1.8 to 2.2, or 2.5, or 3.5; and/or (ii) a density from 0.850 g/cc, or 0.860 g/cc, or 0.865 g/cc, or 0.870 g/cc to 0.877 g/cc, or 0.880 g/cc, or 0.900 g/cc; and/or (iii) a melting point, Tm, from 115° C., or 118° C., or 119° C., or 120° C. to 121° C., or 122° C., or 125° C.; and/or (iv) a melt index (MI) from 0.1 g/10 min, or 0.5 g/10 min to 1.0 g/10 min, or 2.0 g/10 min, or 5 g/10 min, or 10 g/10 min, or 50 g/10 min; and/or (v) 50-85 wt % soft segment and 40-15 wt % hard segment; and/or (vi) from 10 mol %, or 13 mol %, or 14 mol %, or 15 mol % to 16 mol %, or 17 mol %, or 18 mol %, or 19 mol %, or 20 mol % $C_4$-$C_{12}$ α-olefin in the soft segment; and/or (vii) from 0.5 mol %, or 1.0 mol %, or 2.0 mol %, or 3.0 mol % to 4.0 mol %, or 5 mol %, or 6 mol %, or 7 mol %, or 9 mol % octene in the hard segment; and/or (viii) an elastic recovery (Re) from 50%, or 60% to 70%, or 80%, or 90%, at 300% $min^{-1}$ deformation rate at 21° C. as measured in accordance with ASTM D1708; and/or (ix) a polydisperse distribution of blocks and a polydisperse distribution of block sizes.

In an embodiment, the ethylene/α-olefin multi-block copolymer is an ethylene/octene multi-block copolymer. The ethylene/octene multi-block copolymer is sold under the tradename INFUSE™, available from The Dow Chemical Company, Midland, Mich., USA.

In an embodiment, the base 16 and the annular skirt 18 each is composed of HDPE and arms 34, 36, 44, 46 each is composed of ethylene/α-olefin multi-block copolymer. The ethylene/α-olefin multi-block copolymer can be any ethylene/α-olefin multi-block copolymer previously disclosed herein. HDPE and ethylene/α-olefin multi-block copolymer each is an ethylene-based polymer thereby enabling co-molding and/or overmolding of the ethylene/α-olefin multi-block copolymer with/onto the HDPE. In other words, arms 34, 36, 44, 46 composed of ethylene/α-olefin multi-block copolymer and base 16 and annular skirt 18 composed of HDPE enable the collar 12 to be molded, overmolded, or otherwise formed, as a unitary and integral two-material structure. Since HDPE (base 16 and annular skirt 18) and ethylene/α-olefin multi-block copolymer (arms 34, 36, 44, 46) can be co-molded, an advantage of the present collar member 12 is the avoidance of adhesive and/or securement structure for attaching the arms 34, 36, 44, 46 to the base 16.

In an embodiment, all the components of the collar member 12—namely, base 16, annular skirt 18, and arms 34, 36, 44, 46 are composed of a single polymeric material that is the ethylene/α-olefin multi-block copolymer. The collar member 12 is an integral component composed of a single polymeric composition, namely, ethylene/α-olefin multi-block copolymer.

FIGS. 4A-7 show operation of the present dosing cap 10. A person (hand 50, FIG. 4A) sets the desired metered dose amount of liquid to be dispensed by the dosing cap 10 by rotating the cap member 112 about the collar member 12, as shown by arrow A in FIG. 4A. The rotation of the cap member 112 (arrow A in FIG. 4A), raises the cap member 112 (shown by arrow B in FIG. 4B) above the collar member 12 to set a pre-determined volume for the metering chamber 120, and correspondingly a pre-determined or metered dose to be dispensed from the dosing cap 10.

Figure 5A:
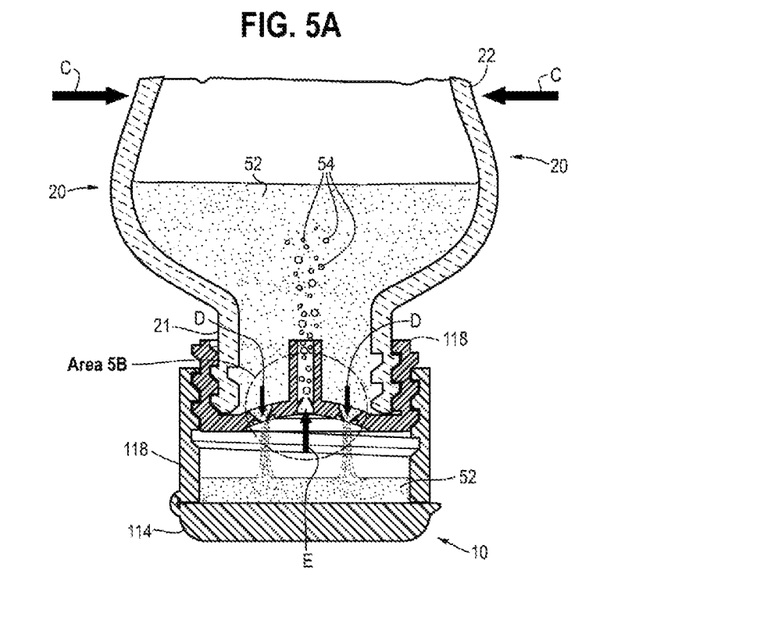
FIG. 5A is a sectional view of the bottle and dosing cap in an inverted position for the filling of the metering chamber, in accordance with an embodiment of the present disclosure.
Figure 5B:
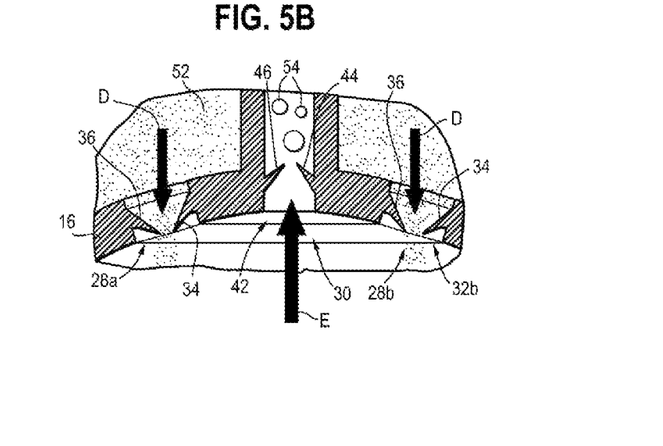
FIG. 5B is an enlarged view of area 5B of FIG. 5A.

The squeeze bottle 20 (with dosing cap 10 thereon) is inverted and the user squeezes the body 22 as shown by opposing arrows C in FIG. 5A. The squeezing force exceeds the elastomeric forces for the arms 34, 36, 44, 46. Openings 32a, 32b permit one-way flow (outward flow arrows D) of liquid 52 residing in the squeeze bottle 20 to flow into the metering chamber 120 as shown in FIGS. 5A, 5B. Simultaneously, the air channel 30 permits one-way flow (inward flow arrow E) of air bubbles 54 into the body 22 of the squeeze bottle 20.

Figure 6A:
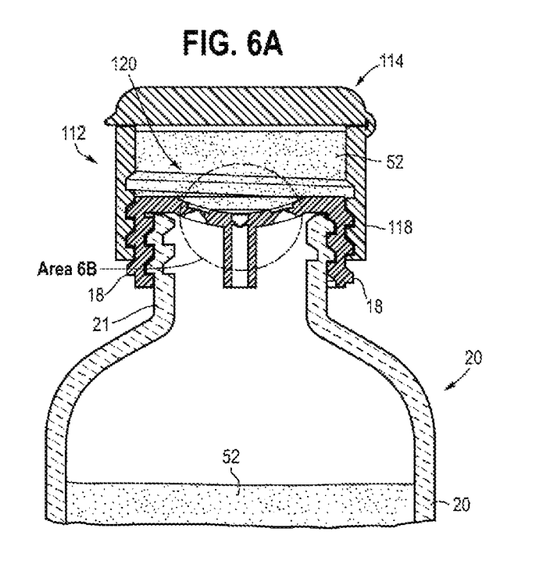
FIG. 6A is a sectional view of the bottle and dosing cap in an upright position and the metering chamber filled with liquid, in accordance with an embodiment of the present disclosure.
Figure 6B:
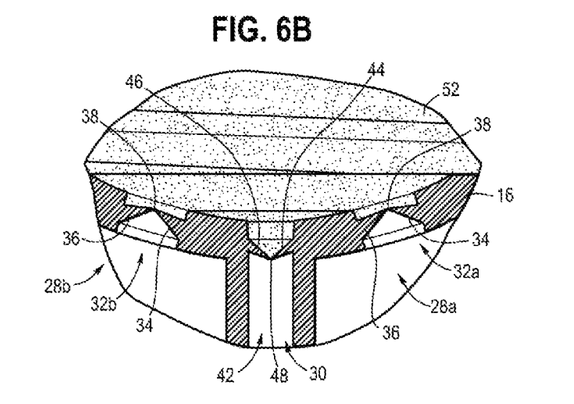
FIG. 6B is an enlarged view of area 6B of FIG. 6A.

The bottle 20 (with dosing cap 10) is returned to the upright position, as shown in FIG. 6A and 6B. The one-way valves of channel 30 and openings 32a-32a prevent backflow of the liquid 52 now residing in the metering chamber 120. FIG. 6B shows biased and opposing orientation of arm 34 to arm 36 maintaining slit 38 closed and prevents liquid 52 from moving back, or otherwise "backflowing," into the squeeze bottle 20. In the normal (non-squeezed state), arm 34 impinges upon arm 36 to keep slit 38 closed, forming a water-tight seal and preventing backflow. Similarly the opposing bias between arms 44 and 46 maintains slit 48 closed and prevents liquid 52 from moving, or otherwise returning to, the squeeze bottle 20. In other words, in the normal state (non-squeezed state), arm 44 impinges upon arm 46 to keep slit 48 closed, forming a water-tight seal preventing backflow.

Figure 7:
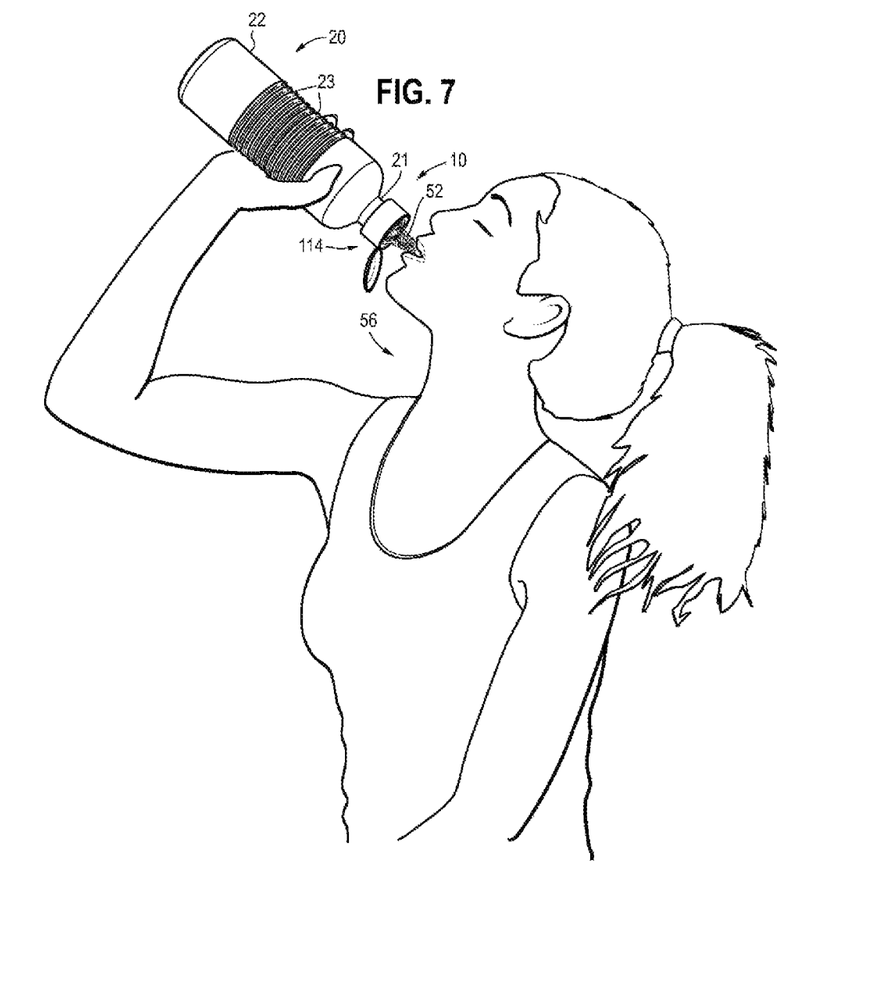
FIG. 7 is a perspective view of a person receiving a metered amount of liquid from the bottle and dosing cap, in accordance with an embodiment of the present disclosure.

In FIG. 7, the user (person) 56 then opens the dispensing element 114 and receives the metered dose amount of liquid 52 from the metering chamber 120. Nonlimiting examples of suitable structures for the dispensing element include push-and-pull cap and flip-top cap. In an embodiment, the dispensing element 114 is a flip-top cap as shown in FIG. 7.

It is specifically intended that the present disclosure not be limited to the embodiments and illustrations contained herein, but include modified forms of those embodiments including portions of the embodiments and combinations of elements of different embodiments as come within the scope of the following claims.

The invention claimed is:

1. A dosing cap comprising:
   (A) a collar member having an annular skirt depending from a base, an inner surface of the annular skirt having a securing member for securing the collar member to a neck of a container;
   the base comprising
   (i) at least one opening with a one-way valve permitting fluid flow in a first direction, and
   (ii) an air channel with a one-way valve permitting fluid flow in a second direction;
   (B) a cap member having an annular sidewall extending from a dispensing element, an inner surface of the annular sidewall having an attachment member adjustably attached to a reciprocal attachment member on an outer surface of the annular skirt;
   (C) a metering chamber formed by an enclosed volume between the cap member and the base; and
   (D) the dispensing element permitting flow of a fluid from the metering chamber.

2. The dosing cap of claim 1 wherein the first one-way valve permits fluid flow from the container into the metering chamber, the first one-way valve preventing backflow from the metering chamber into the container.

3. The dosing cap of claim 2 wherein the second one-way valve permits air flow into the container, the second one-way valve preventing backflow from the metering chamber into the container.

4. The dosing cap of claim 1 wherein the attachment member and reciprocal attachment member are respective first threads and second threads, the first threads and the second threads adjustably interlock the collar member to the cap member.

5. The dosing cap of claim 4 wherein adjustment of the attachment of the cap member to the collar member changes the volume of the metering chamber.

6. The dosing cap of claim 1 wherein the first one-way valve and the second one-way valve each is composed of an ethylene/α-olefin multi-block copolymer.

7. The dosing cap of claim 6 wherein the collar member is composed of an olefin-based polymer.

8. The dosing cap of claim 1 wherein the collar member is a single integral component.

9. The dosing cap of claim 8 wherein the collar member is composed of a single polymeric material that is an ethylene/α-olefin multi-block copolymer.

10. The dosing cap of claim 1 wherein the dispensing element is selected from the group consisting of a flip-top cap, a push-pull cap, a twist cap, and a flapper cap.

11. A dosing cap comprising:
    (A) a collar member having an annular skirt depending from a base, an inner surface of the annular skirt having a securing member for securing the collar member to a neck of a container;

the base comprising
(i) at least one opening with a one-way valve permitting fluid flow in a first direction, and
(ii) an air channel with a one-way valve permitting fluid flow in a second direction;
(B) a cap member having an annular sidewall extending from a dispensing element, an inner surface of the annular sidewall having an attachment member adjustably attached to a reciprocal attachment member on an outer surface of the annular skirt;
(C) a metering chamber formed by an enclosed volume between the cap member and the base,
(i) the opening and the air channel each in fluid communication with the metering chamber and an interior of the container; and
(D) the dispensing element permitting flow of a fluid from the metering chamber.

12. The dosing cap of claim 11 wherein the opening extends through the base.

13. The dosing cap of claim 12 wherein the air channel extends through the base.

14. The dosing cap of claim 13 wherein the first one-way valve permits fluid flow from the container into the metering chamber, the first one-way valve preventing backflow from the metering chamber into the container.

15. The dosing cap of claim 14 wherein the second one-way valve permits air flow into the container, the second one-way valve preventing backflow from the metering chamber into the container.

16. The dosing cap of claim 15 wherein the attachment member and reciprocal attachment member are respective first threads and second threads, the first threads and the second threads adjustably interlock the collar member to the cap member.

17. The dosing cap of claim 16 wherein adjustment of the attachment of the cap member to the collar member changes the volume of the metering chamber.

18. The dosing cap of claim 11 wherein the first one-way valve and the second one-way valve each is composed of an ethylene/α-olefin multi-block copolymer.

19. The dosing cap of claim 11 wherein the collar member is composed of a single polymeric material that is an ethylene/α-olefin multi-block copolymer.

* * * * *